United States Patent
Wang et al.

(10) Patent No.: US 9,339,005 B2
(45) Date of Patent: May 17, 2016

(54) ODOR-ABSORBING MATERIALS AND PROCESSES FOR THEIR PREPARATION AND USE

(71) Applicant: Kent Pet Group, Inc., Muscatine, IA (US)

(72) Inventors: Lin Wang, Iowa City, IA (US); Thomas A Wiesner, Muscatine, IA (US); David Freeman, Iowa City, IA (US)

(73) Assignee: Kent Pet Group, Inc., Muscatine, IA (US)

( * ) Notice: Subject to any disclaimer, the term of this patent is extended or adjusted under 35 U.S.C. 154(b) by 0 days.

(21) Appl. No.: 14/586,417

(22) Filed: Dec. 30, 2014

(65) Prior Publication Data
US 2015/0136036 A1 May 21, 2015

Related U.S. Application Data

(63) Continuation of application No. 13/772,079, filed on Feb. 20, 2013, now Pat. No. 8,950,360.

(60) Provisional application No. 61/600,966, filed on Feb. 20, 2012.

(51) Int. Cl.
| | | |
|---|---|---|
| *A01K 1/015* | (2006.01) | |
| *B29C 44/54* | (2006.01) | |
| *B29C 44/34* | (2006.01) | |

(52) U.S. Cl.
CPC .............. *A01K 1/0155* (2013.01); *A01K 1/0152* (2013.01); *A01K 1/0154* (2013.01); *B29C 44/3461* (2013.01); *B29C 44/54* (2013.01)

(58) Field of Classification Search
CPC . A01K 1/0155; A01K 1/0152; A01K 1/0154; A61L 9/01; A61L 15/46; A61L 9/014; B01J 20/20; B29C 44/3461; B29C 44/54
See application file for complete search history.

(56) References Cited

U.S. PATENT DOCUMENTS

| | | | | |
|---|---|---|---|---|
| 3,921,581 | A * | 11/1975 | Brewer | 119/173 |
| 4,206,718 | A * | 6/1980 | Brewer | 119/171 |
| 5,209,185 | A * | 5/1993 | Chikazawa | 119/171 |
| 5,491,087 | A * | 2/1996 | Zamost et al. | 435/200 |
| 5,860,391 | A * | 1/1999 | Maxwell et al. | 119/173 |
| 6,380,129 | B1 * | 4/2002 | Kraemer | B01J 20/10 210/924 |
| 6,423,657 | B1 * | 7/2002 | Wang et al. | 502/25 |
| 2005/0101482 | A1 * | 5/2005 | Aoyagi et al. | 502/401 |
| 2008/0063750 | A1 * | 3/2008 | Rivera et al. | 426/16 |
| 2008/0223302 | A1 * | 9/2008 | Wang et al. | 119/173 |
| 2009/0007852 | A1 * | 1/2009 | Fritter | A01K 1/0152 119/173 |
| 2009/0267349 | A1 * | 10/2009 | Spitzauer et al. | 290/52 |
| 2010/0136128 | A1 * | 6/2010 | Hurwitz et al. | 424/499 |
| 2011/0123474 | A1 * | 5/2011 | Jenkins et al. | 424/76.6 |
| 2012/0202259 | A1 * | 8/2012 | Grabar et al. | 435/136 |
| 2013/0280774 | A1 * | 10/2013 | Blake et al. | 435/146 |

FOREIGN PATENT DOCUMENTS

JP          2004141037 A  *  5/2004  ............. A01K 1/015

* cited by examiner

*Primary Examiner* — Kathleen Alker
(74) *Attorney, Agent, or Firm* — Fitch, Even, Tabin & Flannery LLP

(57) ABSTRACT

A slightly puffed, low density, moisture-adsorbing and odor-absorbing additive that can readily remove undesirable odors from a confined space is produced from re-purposed spent carbon materials obtained from other processes. The product is particularly suitable as an addition to animal litters and the like with possible uses in human applications. An aspect of the method includes a step of extruding a spent carbon mixture, optionally containing diatomaceous earth to obtain the additive. Also disclosed are de-germinated corn flour, of grits, that aid process flow and can serve as a substrate for the spent carbon materials.

6 Claims, No Drawings

ODOR-ABSORBING MATERIALS AND PROCESSES FOR THEIR PREPARATION AND USE

RELATED APPLICATION

This application is a continuation of U.S. application Ser. No. 13/772,079, filed Feb. 20, 2013, now U.S. Pat. No. 8,950,360, which claims the benefit of U.S. application Ser. No. 61/600,966, filed Feb. 20, 2012. The contents of these applications are incorporated herein by reference in their entireties. Also incorporated in their entireties are the disclosures of prior provisional application Ser. Nos. 61/600,971; 61/600,976; and 61/600,978. Those applications specify animal litters with which the additive described herein may be used.

TECHNICAL FIELD

In certain aspects the invention pertains to a process for re-using and re-purposing spent material such as spent carbon material containing powdered or activated carbon, from other industrial processes, to obtain a product having odor reducing characteristics. In one of its aspects, the invention relates to a method for preparing a low density, moisture-absorbing, odor-absorbing granular material that includes spent carbon material. In another aspect, the invention pertains to an odor-absorbing material containing carbon.

BACKGROUND

Activated carbon products are commonly used in diverse industries. Activated carbon is used successfully for purification and remediation applications. Powdered activated carbons (PAC) have been used for more than 90 years to purify a wide variety of food, water and chemical products. Powdered activated carbon typically has an extraordinarily large surface area and pore volume. The particle size distribution of powdered activate carbon is typically controlled to provide combinations of fast kinetics, high capacity, good settling and suspension characteristics and low-pressure filtration in various applications. Powdered activated carbons are available in a variety of grades; they cover a range of pore size distributions, surface chemistries and purity levels. For example, powdered activated carbon can generally have a mean particle size of less than about 500 microns. Many grades of activated carbon meet the standards of the Food Chemical Codex and are certified NSF/ANSI 61 and 42. For example, Nuchar SA-20 brand powdered activated carbon (Westvaco) is commonly used in preparing carbon-containing blends with diatomaceous earth, from which certain spent carbon materials can be recovered.

Environmental applications for powdered activated carbon include potable water and odor control. Activated carbon is also commonly used to purify water containing halogenated hydrocarbons such as trihalomethane, color, chlorine/chloramine, and various man made organic compounds such as herbicides and pesticides. The removal of organic compounds from process water is commonly practiced in a wide range of industries, including chemical manufacturing and petroleum refining. The removal of free chlorine from water is a process widely used throughout the world by beverage manufacturers, industrial water treatment processors and others. Activated carbon is used when removing the total residual combined chlorine that exists after chlorination to reduce the toxic effects of chlorinated effluents discharged to receiving waters or to be used for reuse applications.

Various facilities that employ combustion or incineration processes (including municipal waste incinerators, hazardous waste incinerators, and medical waste facilities) require safe, easy, and cost-effective methods of mercury and/or dioxin control to meet strict federal regulations. Certain forms of activated carbon are used in municipal wastewater treatment, biological filters, and chemical scrubbers. Industrial process water is widely treated for the removal of free chlorine and organic compounds, and often demineralized, and disinfected.

It will be appreciated that these and other processes consume large amounts of activated carbon, especially powdered activated carbon. After use the activated carbon becomes spent carbon. Spent carbon presents issues regaling disposal, possible re-generation, and other problems. The challenges are both technological and economic.

Activated carbon sometimes has been proposed as an additive for animal litters. As a primary component to the spent carbon material, powdered carbon or activated carbon has been deemed essential to obtaining an additive capable of removing undesired odors. By itself, activated carbon is frequently undesired for use in animal litters because it tends to segregate out during shipping, thereby creating dust. Another drawback is the so-called "black paws" where an animal's paws pick up carbon particles from litter and track the carbon particles around. Efforts to incorporate activated carbon in litter by conventional granulation methods yield granules with limited surface area for absorbing odors.

SUMMARY

It has now been found that spent carbon type products from industrial processes, such as from food processing or water treatment processes, can be used with a limited number of ingredients to form a low density, spent carbon based, odor-absorbing granular product. It also has been found that activated carbon, especially powdered activated carbon, can be usefully employed as an odor-absorbing material in animal litter formulations with improved odor-absorbing capacity and without drawbacks associated with heretofore reported efforts with such material. In some embodiments, this activated carbon material can take the form of spent carbon material from an industrial process.

In some embodiments, spent carbon material is subjected to heat and mechanical work, typically using an extruder, to obtain an odor-absorbing carbon product. A method for preparing an odor-absorbing product thus may comprise the steps of (a) extruding a blend including spent carbon material, a binder, and optionally additional ingredients under conditions sufficient to obtain a cohesive cuttable extrudate; and (c) drying the extrudate to obtain the odor-absorbing product. The odor-absorbing product preferably is an at least partially puffed product to thereby provide a larger odor-absorbing surface area than would be obtained in other granule-forming processes.

In another of its aspects, the present invention relates to a method of processing spent filtration material that comprises activated carbon and, optionally, diatomaceous earth, the method comprising (a) extruding a blend including spent carbon material, optionally, diatomaceous earth, a binder, and optionally, additional ingredients to obtain a cohesive cuttable extrudate; and (b) drying the extrudate to obtain an at least partially puffed odor-absorbing product. The odor-absorbing product preferably is an at least partially puffed (relatively porous) product so carbon particles are exposed over a larger odor-absorbing surface area.

The at least partially puffed odor-absorbing pellet is produced via extrusion at high temperature, by which is contemplated a temperate sufficient to inactivate microbiological components in the spent carbon material. It is believed that, when an extruder in employed, the temperature in at least one zone of the extruder should be above 200 degrees F., more preferably above 250 degrees F. When the spent carbon material has been recovered from an industrial process, it is believed that the heat will denature at least in part any unwanted organic materials and will destroy microbiological components. The spent carbon can be extruded with minimal moisture addition to the extruder barrel and with a normal screw configuration. The resulting spent carbon granular pellet exhibits the ability to aid in odor removal where the absence of undesirable odors is preferred. It is preferred that the extrusion be conducted for such time and at temperatures sufficient to remove any unwanted microbiological contaminants in the blend. It is believed that sterilization may be achieved when subjecting a blend for sufficient time to the elevated temperature and pressures in the extruder.

Since the product is preferably at least partially puffed, and preferably porous, it has significantly larger working odor-absorbing surface area as compared to solid granulated or agglomerated particles of an odor-absorbing product containing powdered activated carbon. The carbon powder is preferably embedded in and on the surface of the present odor-absorbing product.

The extruded, dried and odor-absorbing product may exhibit a relatively low density, especially in embodiments in which the product is at least partially puffed. The product can be made to exhibit excellent handling during bulk loading and while being processed/handled in various types of equipment.

The product is deemed to find particular applicability in many fields including the field of air filtration, but is deemed particularly useful in the field of animal litters. Advantageously, the converted product can aid in the removal of undesirable odors in congruence with litter bases. This product is suited for in home uses where odors are typically either not removed or slowly removed when using the litter base itself. Advantageously, in other embodiments the product is incorporated in air filtration systems, such as in poultry and hog farms, to remove odors.

Other aspects of the present invention involve enhancing the odor-absorbing characteristics of an existing animal litter through the addition of the present odor-absorbing product.

In aspects of the present invention, an animal litter comprising the present moisture-absorbing addition is obtained. The odor-absorbing product can be incorporated into the animal litter as part of the process of preparing the animal litter from base ingredients, or discrete particles of the odor-absorbing product can be physically blended with discrete particles of a previously prepared animal litter. When added to an existing litter, the particles of odor-absorbing product provide additional capacity to absorb odors and undesirable aromas.

Still another aspect concerns methods for removal of waste, such as animal waste. A container including a litter of the invention is provided, and an animal is allowed to excrete waste into the litter, whereby liquid present in the waste causes agglomeration of at least some of the litter into at least one clump. The clump is then removed from the container. The litter is useful in conjunction with removal of waste from house cats, and also in conjunction with removal of waste from other animals, such as other mammals (e.g. rodents) and birds. It will be appreciated that the animal litter can be prepared from the present odor-absorbing product; the odor-absorbing product can be separately prepared and blended with discrete particles of a previously prepared animal litter and that blend placed in the container (such as a litter box); or the additive can be separately prepared and combined to an existing litter in a container in order.

DETAILED DESCRIPTION OF PREFERRED EMBODIMENTS

An aspect of a present method for preparing the granular moisture-absorbing additive involves extruding a blend prepared using powdered carbon material. Preferably the spent carbon material is re-claimed after being generated in another industrial process, whereby in this aspect a present method may be deemed a so-called "green" process. The spent carbon material may be washed and/or dried to obtain a product with a moisture content that is suitable for use in producing the odor-absorbing product in accordance with the present invention. The spent carbon materials are not limited to specific spent carbon materials, nor limited to materials recovered from a specific process. By present preference, spent carbon material is obtained (recovered) from another industrial process is not a biohazard, and is preferably not contaminated with heavy metals, biological waste and pathogens.

In general, spent carbon materials contemplated herein contain spent activated or granulated carbon. The spent carbon materials can also contain additional filtration material such as diatomaceous earth. In the latter instance, the spent carbon material contains two major constituents: diatomaceous earth or powdered or activated carbon, in addition to a binder. The spent carbon material can contain about 0% to about 80 wt. % diatomaceous earth and from about 100% to about 20 wt. % powdered or activated carbon.

The spent carbon material can be recovered from a water treatment process or from a food process, as examples. Food processes include starch hydrolysis as web as brewing. For example, the spent carbon material can be recovered from a brewing process or a starch hydrolysis production facility and then re-purposed in a present process instead of being treated as waste requiring disposal. Starch hydrolysis production includes partial or total splitting of the long starch molecules into smaller fragments by chemical or enzymatic processes, purification, concentration and other unit operations for obtaining the desired product (such as a sweetener product). General descriptions of starch hydrolysis are provided in Kearsley et al, *Handbook of Starch Hydrolysis Products and Their Derivatives*, (1995); and Hull, *Glucose Syrups Technology and Applications*, Wiley Blackwell (2010), the disclosures of which are incorporated herein by reference. For example, in Chapter 3, Hull describes glucose syrup manufacture.

In general the commercial processes and associated equipment are designed with respect to the type of raw material and final product specification. Thus, industrially, starch hydrolysis production may vary somewhat depending on the manufacturer and depending on other factors, such as the starch hydrolysate produced and on the dextrose equivalent (or "DE") value of the product. Starch hydrolysis processes generate waste materials and it has long been desired to provide alternatives to the costs associated with treating and disposing waste materials. In conventional stared hydrolysis, various treatments, including carbon treatments and duration treatments, are performed to remove undesired organic materials, insoluble materials, colors and the like. The carbon treatments typically require forms of powdered carbon and/or granulated activated carbon, which generate spent carbon material. In starch hydrolysis production certain filtration treatment can be performed using diatomaceous earth. In other processes, including certain starch hydrolysis operations as well as various water purification operations, a filtration step may involve a layer of activated carbon over a layer of diatomaceous earth (as a filtration aid), and both can be re-claimed in combination as spent carbon material. In principle, spent carbon material from a carbon treatment can also be mixed with diatomaceous earth from a filtration treatment and used herein provided it capable of being extruded in accordance with the present invention. Although not preferred, spent carbon can be combined with fresh diatomaceous earth for the purposes of obtaining a spent carbon material for forming a blend from which the moisture absorbent additive can be prepared. And, in principle, fresh activated carbon can be combined with re-purposed diatomaceous earth from a filtration system, such as from starch hydrolysis or a brewing process. The present inventions include methods for forming the product from any of such materials.

Diatomaceous earth, also known as diatomite, is a naturally occurring, soft, siliceous sedimentary rock that is easily crumbled into a fine white to off-white powder. It can have a particle size ranging from less than 1 micrometer to more than 1 millimeter, but typically 10 to 200 micrometers. This powder has an abrasive feel, similar to pumice powder and is very light, due to its high porosity. The typical chemical composition of an oven dried diatomaceous earth is 80 to 90% silica, with 2 to 4% alumina (attributed mostly to clay minerals) and 0.5 to 2% iron oxide. Diatomaceous earth consists of fossilized remains of diatoms, a type of hard-shelled algae. Diatomaceous earth itself may be used as a primary ingredient in cat litter formulations for liquid and odor absorption and poses no harm to chemical harm to humans or animals due to its formation in a freshwater source, but by itself does not have the carbon materials (activated carbon or powdered carbon) contemplated by the term spent carbon materials.

In general, the diatomaceous earth component in or combined to form a spent carbon material can be any commercially available diatomaceous earth. Hence, in principle most silica based diatomaceous earths can be utilized. A spent carbon material may include Celatom FW-14 (Celatom) or FW-14 (EP Minerals) brand diatomaceous earth, as an example.

Re-claimed spent carbon materials typically contain significant amounts of moisture. Spent carbon materials from starch hydrolysis and other filtration treatments contain significant amounts of moisture. A moisture content of approximately 25 to 35% is not unexpected. The density of spent carbon may depend on its moisture content.

To prepare the spent carbon additive, by preference, but not as a requirement, the spent carbon material is blended with other materials, particularly a suitable matrix or binder material, which preferably includes a biodegradable material, to ensure the carbon particles are embedded in and on the surface of an at least partially puffed odor-absorbing product prepared in accordance with a method embodiment of the present invention. The matrix or binder material can, if desired, be re-purposed from another process to reduce waste disposal cost, again as a green process, provided it is suitable for extrusion and is suitable for preparing an at least partially puffed odor-absorbing product. Certain materials can promote cohesiveness in the odor-absorbing product and are also biodegradable. The binder is preferably such that the extrudate is cuttable. Other ingredients can be added to the blend to be extruded, such as anti-microbial agents, especially when the matrix or binder material is biodegradable.

The binder or matrix material can be any material suitable to bind the spent carbon. For example, the binder may be powdered or granular grits or flour, which are biodegradable. Flour includes whole flour as well as de-germinated flour. Flour can include rice flour, corn flour, wheat flour and the like. By preference the flour is de-germinated corn flour or de-germinated ground corn grits. For example, when the matrix or binder material comprises flour (such as de-germinated corn flour or granulated corn grits), it can, in principle, function in part as a cohesiveness agent. Since such substances are biodegradable, ingredients to reduce the prospects for spoliation and other ingredients can be added to the blend before or during extrusion.

Generally, in preparing the extrudate, the spent carbon is blended with the binder or matrix material to form a blend and this blend is subjected to extrusion. The blend contains on a solids basis sufficient spent carbon (powdered activated carbon) to provide odor-absorbing capability. Depending on the matrix or binder, sometimes referred to as a substrate, the composition for extrusion can contain upwards of 50% spent carbon, although in principle greater amounts are feasible provided the at least partially odor-absorbing product does not generate unacceptable amounts of carbon dust during packaging, shipping and use.

The blend may be subjected to heat and mechanical work in an extruder to obtain a cohesive and at least partially puffed product. The blend containing spent carbon material can be extruded under conditions, temperatures and pressures to provide an extruded, low density pellet that has the ability to absorb undesirable odors. The product is puffed. The product is dried and is generally considered a low moisture product. A puffed product means the extrudate is at least partially expanded, e.g., a partially puffed.

Preferably, the extrusion back pressure should be sufficient enough to obtain a slightly puffing or expansion effect in combination with shear stress on the ingredients and the effect of moisture flashing off the product at an atmospheric or ambient temperature. The back pressure can be in the range of 500-1000 psi, although in principle other pressures can be employed.

It is presently preferred that, aside from any moisture content of the spent carbon blend, the spent carbon blend is extruded under conditions in which minimal amounts of moisture are added, more preferably in the substantial absence of additional moisture, especially when a spent carbon material has a relatively high initial moisture content, to achieve expansion and loss of moisture consistent with obtaining a product that is moisture-absorbing as well as odor-absorbing. In principle, a minimal amount of water may be added during the extrusion. Moisture from the spent carbon blend and/or from any added water is flashed off. The residual moisture in essence may serve as a blowing agent for the blend as it extrudes through the die(s) of an extruder. This promotes production of an at least partially puffed extrudate. Exemplary addition of moisture is described in the Examples.

A suitable extruder is a Wenger TX-57 brand twin-screw extruder from Wenger. By preference, the extrusion system includes pre-conditioning capabilities, temperature settings and multiple screw configuration options. It should be appreciated that the extruder is not limited to particular settings or screw configurations. In general, an extruder is provided with an extrusion die(s) and a cutter (s). The extrusion die(s) is selected so the die imparts a desired shape and size to the extrudate. For instance, an opening in a die can have a circular circumference with a suitable diameter. Common die configuration diameters can range from about 1 mm to 5 mm, particularly 2 mm to 4 mm in diameter, and more particularly about 2 mm to 3 mm diameter. The extrudate is cut to a desired size-length by the cutter. A pellet having a circular circumference is obtainable. The discrete pellets can be processed further as needed. It will be appreciated that the extrusion conditions are selected so that an expanded cuttable extrudate is obtained. Preferably the extrudate is cut before drying.

The extrudate is then dried to the desired moisture content. The product has a moisture content that is sufficiently high to prevent the particles from being friable, but preferably sufficiently low enough that the product has capacity to absorb moisture.

The extruded, low density spent carbon additive can be granular but is none-the-less preferably at least partially puffed, and thus porous. The at least partially puffed product has a greater exposed surface area with activated carbon than a comparably sized solid particle because exterior and interior surfaces are exposed due to its expanded structure. In contrast, in a solid granulated particle each layer is successively accreted over a prior layer to form a large granule whereby carbon particles in successive under layers are buried in the process of granulation, and thus the available exposed surface for odor absorption (carbon particles) is undesirably substantially reduced.

The extruded, dried odor-absorbing additive is used in diverse applications, including odor absorption for various air filtration technologies, but is most suitable for animal litters, plant or clay based, particularly natural or plant based litters, especially for absorbing odors. For example, the extrudate of carbon materials, which may be fresh or spent carbon materials, or spent carbon or fresh carbon can be used as odor absorbing materials in other applications like an air filtration system, where the embedded carbon in a sheet or column or granule form, will eliminated shortcomings of powdered carbon and granulated carbon.

In one of its aspects, the present invention relates to an animal litter. Animal litters to which the present product can be added include those described in U.S. Pat. Nos. 7,757,638; 7,753,002; 6,868,802; 6,622,658; 6,405,677; 6,216,634; and 6,098,569, and in pending application Ser. No. 13/103,778, all assigned to Grain Processing Corporation of Muscatine, Iowa, the complete disclosures of which are incorporated herein by reference. The litter can be any type of animal litter or bedding, including clay, wood-based, silica crystals, paper based, grain based, or agricultural by-products based. Preferably, the litter is made of biodegradable materials.

An animal litter has a moisture content that is sufficiently high to prevent the particles from becoming friable but is sufficiently low to allow additional moisture to be absorbed. Preferably, the moisture content is less than about 30% based on the weight of the litter. More preferably, the moisture content is less than 25% and ranges, for instance, from about 3% to about 25%; even more preferably, the moisture content is less than 20% and ranges, for instance, from about 5% to about 20%; and most preferably the moisture content is less than 15% and ranges, for instance, from about 8% to about 15%.

It will be appreciated that the particle size distribution of the additive or an animal litter containing the additive can have an effect on the functional properties of an animal litter. If there is a relatively high population of very large particles, the litter may absorb liquids more slowly and also may be less effective in marking ammonia odor or other undesirable odors of spent animal litter. On the other hand, a relatively high population of small particles or fines can result in "tracking" and reduced clump strength. Since the present product is preferably an at least partially puffed product, it should have a sufficiently large particle size to avoid tracking, while the at least partially puffed (and preferably porous) character with a larger surface area should advantageously provide useful odor and moisture-absorbing characteristics.

Because an animal litter is to be used to absorb animal waste, e.g., urine, the litter should have an absorption capacity sufficient to allow the animal litter to so function. The absorption capacity of the litter of the invention preferably is at least about 0.04 ml water per gram of litter, more preferably ranges from about 0.5 to about 1.5 ml/g, and most preferably ranges from about 0.8 to about 1.2 ml g. Preferably, the odor-absorbing product herein has similar moisture-absorbing capacity. The absorption capacities specified herein are determined per gram of animal litter, based on the absorption of deionized water. Preferred absorption capacity ranges based on the absorption of deionized water are believed to approximate that of animal urine.

It may be desired that the animal litter exhibit additional properties. For example, to minimize inconvenience and mess associated with packaging, transporting, and using the litter, the litter preferably generates a minimal amount of dust. The preferred litters of the present invention do not generate substantial dust, and ordinarily do not require dust reducing agents (although such may be added if desired). Moreover, a preferred litter has a sandy-like texture, which may preferred by domestic animals such as cats.

An animal litter should exhibit sufficient clumping efficiency. Clumping efficiency is the amount of litter required to form a clump with a given volume of liquid, with lower amounts of required litter corresponding to higher clumping efficiencies. Less than about 60 grams of litter will absorb 30 ml of animal urine, and less than 40 g may suffice for most animal litters. An odor-absorbing additive herein may have a relative low density, but is expected to have suitable moisture-absorbing capacity.

In certain aspects of the present invention, an odor-absorbing additive as well as an animal litter prepared from or incorporating it contains a natural plant based substrate, and tends to be biodegradable. In which case, because a preferred odor-absorbing additive and animal litter may include biodegradable materials, they are subject to spoilage, such as by molding or bacterial action. To prevent or inhibit such spoilage, the additive and litter can include a microbial inhibitor. A microbial inhibitor can be present in any amount effective to inhibit or prevent the spoilage of the additive or animal litter as the case may be. Typically, any ingredient capable of maintaining a pH of from about 3 to about 5.5 is effective to prevent or inhibit spoilage of the animal litter or additive, as the case may be.

In an aspect of the inventions, a spoilage inhibitor can be a mold inhibitor. Any suitable mold inhibitor can be employed in conjunction with the additive. The mold inhibitor can include, for example, sodium chloride (which can also provide supplemental cohesive properties), propionic acid, propionate salts (e.g., sodium propionate, calcium propionate and the like), citric acid, citric acid salts (e.g., sodium citrate, calcium citrate, potassium citrate and the like), benzoate salts (e.g., sodium benzoate), parabens (e.g., methylparaben, ethylparaben, propylparaben and the like), sorbic acid, and sorbic acid salts (e.g., potassium sorbate and the like), lactic acid and lactic acid salts, acetic acid and acetic acid salts, alginic acid and alginic acid salts, and any combination thereof. Aside from the present additive, similar inhibitors can be used in an animal litter.

A suitable mold inhibitor includes citric acid, sodium chloride, potassium sorbate, or any combination thereof as mentioned above. If used, a mold inhibitor may preferably include a combination of citric acid, sodium chloride and potassium sorbate or a combination of citric acid and sodium chloride.

When citric acid is used, it is preferably present in an amount of about 0.5% to 2% by weight of the additive. When sodium chloride is used, it is preferably present in an additive of the invention in an amount of about 2% by weight of the additive (sodium chloride is believed to function as a supplemental cohesiveness agent when used in this amount). When potassium sorbate is used, it is preferably present in the additive of the invention in an amount of from 0.1-0.5%, more preferably from 0.1-0.2%, by weight of the additive. Aside from the additive, similar percentages are applicable to an animal litter that includes such an inhibitor(s). Other microbial inhibitors may be included if desired, and such ingredients can be present in any amount suitable for their intended purpose.

The litter may be provided with a fragrance-imparting material to provide a pleasant scent. In one aspect, a scent is provided from a natural source, such as but not limited to alfalfa, almond, amber, angelica root, anise, apple, apricot, banana, basil, bay, bay laurel, benzoin, bergamot, bitter orange, black pepper, bois de rose (rosewood), cajeput, cardamom, carrot seed, cedarwood, cedarwood atlas, cinnamon, citronella, citrus, clary sage, clove, cocoa, coconut, coffee, coriander, cranberry, cypress, elemi, eucalyptus globulous, eucalyptus, fennel, frankincense, galbanum, geranium, German chamomile, ginger, grapefruit, helichrysum, hyssop, jasmine, juniper berry, lavender, lemon, lemongrass, lily, linden blossom, mango, marjoram, melissa, mint, myrrh, myrtle, neroli, niaouli, nutmeg, orange, oregano, palm, parsley, patchouli, peach, peppermint, petitgrain, pine, pineapple, raspberry, Roman chamomile, rose, rosemary, sandalwood, spearmint, spruce, strawberry, tea, thyme, vanilla, vetiver, violet, yarrow, ylang ylang, and the like. Plant parts that do not provide a scent or have very low scent but that are visually appealing can also be used. The plant parts can be subjected to a process to reduce the size of the parts to a size suitable for addition to an animal litter.

Essential oils or other plant extracts can be used in the litters described herein. Extracts can be physically obtained, such as by pressing or squeezing, or by using solvent, such as oil, organic solvent, or water, to process plant parts. For example, orange oil can be obtained from orange peels, and rose oil can be extracted from rose petals using vegetable or mineral oil. Commercially-available essential oils can also be used, if desired. By one approach, one or more plant extracts or essential oils can be blended to provide a desired scent. For example, a blend of plant extracts can be provided to give a rose, "earthy," "spring," "fresh," "ocean," or other desired scent as can be readily formulated by a skilled person in the art.

In one aspect, the deodorizing agent may include natural or synthetic fragrances. Suitable fragrances include, for example, Modern Lavender, Lavender Fields, Natural Fresh Clean, Baby Fresh Natural, Natural Amber Balsam, Natural Sweet Amber, Natural Fresh Citrus, Natural Fresh Air, and Rose from Fragrance West, Van Nuys, California, Baby Fresh, Lilac, Violet Rose, Jasmine, and Lavender from Bell Flavors & Fragrances, Inc., Northbrook, Illinois, Natural Lavender, Rose Geranium, Natural Rosemary Mint, Baby Powder, and Fresh Blossoms Natural from Flavor and Fragrance Specialties, Mahwah, New Jersey, and Lavender, Jasmine, Amber, and Fresh Wave from Alpha Aromatics, Fox Chapel, Pennsylvania.

In some embodiment, the litters provided herein include colorful plant parts, such as flowers, flower buds, petals, or the like, to provide visually appealing colored particles to the litter. In one aspect, the colorful plants parts also provide a natural scent to the litter. In another aspect, the colorful plant parts are provided in combination with a natural based fragrance, such as with a scented oil. For example, brightly colored particles made from dried flowers and petals are often weak in scent and the fragrance of the particles can be enhanced by inclusion of a natural or synthetic fragrance.

The litter may include a blend of essential oil formulated to have lavender scent. For example, "Natural Lavender" fragrance Item#114B13 or 112E13 made by Flavor and Fragrance Specialties, Mahwah, New Jersey, can be sprayed onto the animal litter at the ratio of 1.6 to 3.5 pounds per ton to provide the litter with a lavender scent.

By another approach, a blend of essential oil formulated to fresh blossom scent, like the "Fresh Blossoms Natural" fragrance Item#112B17 made by Flavor and Fragrance Specialties, Mahwah, New Jersey, can be sprayed onto the animal litter at the ratio of 1.6 to 3.5 pounds per ton to provide the litter with a fresh flower blossom scent.

The litter may include dried lavender flowers and flower buds can be added to the lavender or fresh blossom scented litter at a ratio of 1 to 6.3 pounds per ton of litter. The dried lavender flowers and buds provide a pleasant and sweet scent to the litter while also providing bright colored particles which are appealing to consumers. The flowers provide the impression of a natural fresh scent even though the scent is provided primarily from the essential oil.

In another aspect, dried global amaranth blowers and flower petals can be added to the lavender or fresh blossom scented litter.

By another approach, no scented oils are added to the litters. Instead, dried global amaranth flowers and flower petals are added at a ratio of about 0.88 pounds per ton of litter and lavender flowers and buds are added at a ratio of about 6.3 pounds per ton of litter. The global amaranth flowers and petals have significantly brighter color than the lavender flowers and provide brightly colored particles that are appealing to consumers but are weak in scent. The dried lavender flowers and buds provide an appealing visual appearance and a pleasant and sweet scent to the litter. The colorful amaranth flowers and scent from the lavender flowers provide consumers with the impression of a natural fresh scent.

In yet another aspect, dried "forget-me-not" flowers, rose petals, purple clover flowers, global amaranth flowers and flower petals, cornflower, cowslip, St. John's wort flowers, yarrow flowers, or field poppy flowers, are added to the litter at a ratio of about 0.88 pounds to 2 pounds per ton of litter. The dried flowers and petals provide brightly cohered particles that are appealing to consumers.

By one approach, the scent of the litter can be changed seasonally. For example, the litter can be scented to reflect each of the four seasons of the year. For example, a coffee scent can be prepared from spent coffee grounds. A vanilla scent can be provided from vanilla extract. A coconut scent can be provided from coconut copra pellets. A strawberry or apple scent can be provided by addition of apple or strawberry by products.

In souse cases, the animal litter including plant parts and/or fragrance is packaged under conditions effective to lengthen the shelf life of the scented product. In one aspect, the scented litters can be packaged in a plastic bag with oxygen barrier properties, such as, for example, a laminated polyethylene and polyester or nylon plastic package. In another aspect, the packaging is purged with nitrogen gas to reduce the oxygen level inside the package to less than 10 percent v/v, preferably less than 2 percent v/v. The lower oxygen content would reduce the oxidization of components of the natural fragrance, which was believed to reduce the shelf life of the natural fragrance. Under these conditions, the shelf life of the scented litter is at least about 20 weeks.

The invention further provides a process for preparing an animal litter. Generally, in one embodiment the process comprises providing a litter and adding the odor-absorbing additive to the litter. In another embodiment, the odor-absorbing additive is added to the other litter ingredients, and a litter is formulated from those ingredients. In either case, the litters may be prepared in accordance with the teachings of the heretofore discussed animal litter patents.

In an other aspect, the invention further provides a method for removing animal waste, which method generally contemplates providing a container containing an animal litter of the present invention, allowing an animal to excrete waste into the container, whereby moisture from the waste causes the animal litter to agglomerate into at least one clump; and removing the clump of litter from the container and preferably any solid waste so as to remove the animal waste. By "container" is meant to include any enclosed or partially enclosed area, such as a litter box, a cage, a stall, a pen (such as a poultry coop), or the like. The method for the removal of animal waste is contemplated to be useful for all animals capable of excreting waste on land, such as cats, dogs, mice, birds, gerbils, reptiles, and other animals, and finds particular applicability in connection with removal of waste from domestic house cats. The method for the removal of animal waste also may be useful for the removal of waste generated by farm animals such as chickens, livestock, or the like.

EXAMPLES

Aspects of the present inventions are described with reference to the following non-limiting examples.

Example 1

Fifty pounds of spent carbon containing diatomaceous earth and powdered activated carbon was obtained from starch hydrolysis production (Grain Processing Corporation of Muscatine, Iowa) and was blended with 144 pounds de-germinated ground corn grits from ConAgra, 2 lbs. of citric acid (Tate & Lyle) and 4 lbs. fine grade salt (Cargill Inc.). The blended material was extruded in a twin screw extruder (Model TX-57 brand twin screw extruder, Wenger) using a feed rate of 180 lb/hr with a cylinder speed of 350 RPM and shaft speed at 160 RPM. 3.7 lb/hr steam was forced through cylinder while also feeding 4 lb of water/hr. The extruder was provided with a die containing 17, 3 mm diameter die holes. The extruder was provided with a cutter having thin stainless steel blades and the cutter was set so the blades rotated at 3000 RPM with minimal back pressure. The twin screw extruder contained five separately heated chambers that were each set to specific temperatures to control shear and expansion to adhere all ingredients in blend to one another. The blend was extruded through the die and cut with the cutter to obtain puffed circular pellets sized 3-4 mm and immediately dried using a belt dryer set at 185° F. (85° C.) and a slightly puffed, low density carbon, odor absorbing granular additive with minimal moisture content was obtained. The spent carbon used had a moisture content in the range of 20-50%. The extrudate produced had a loose density of around 25 lbs/cu. ft.

The extruder had five zones and the conditions in each zone were as follows:

| | |
|---|---|
| $1^{st}$ | 100 |
| $2^{nd}$ | 175 |
| $3^{rd}$ | 275 |
| $4^{th}$ | 275 |
| $5^{th}$ | 280 |

Example 2

The blended material as in Example 1 was extruded in a twin screw extruder (Model TX-57, Wenger) using a feed rate of 180 lb/hr with a cylinder speed of 350 RPM and shaft speed at 160 RPM. 3.7 lb/hr steam was forced through cylinder while also feeding 4 lb of water/hr. The extruder was provided with a die containing 17, 2 mm diameter die holes. The twin screw extruder contained five separately heated chambers that were each set to specific temperatures to control shear and expansion to adhere all ingredients in blend to one another. The blend was extruded through the die and the extrudate was cut with the cutter to obtain puffed circular pellets sized 2-3 mm. The puffed circular pellets were immediately dried using a belt dryer set at 185° F. (85° C.) and a slightly puffed, low density carbon, odor absorbing granular additive with minimal moisture content was obtained. The extrudate produced had a loose density of around 25 lbs/cu. ft.

The extruder had five zones and the conditions in each zone were as follows:

| | |
|---|---|
| $1^{st}$ | 100 |
| $2^{nd}$ | 175 |
| $3^{rd}$ | 275 |
| $4^{th}$ | 275 |
| $5^{th}$ | 280 |

Example 3

Fifty lbs. of spent carbon containing diatomaceous earth and powdered activated carbon was obtained from starch hydrolysis production (Grain Processing Corporation of Muscatine, Iowa) and was blended at a slightly lower level, compared to Examples 1 and 2, with 144 lbs de-germinated ground corn grits from ConAgra, 2 lbs. citric acid (Tate & Lyle) and 4 lbs. fine grade salt (Cargill Inc.). The blended material was extruded in a twin screw extender (Model TX-57 brand twin screw extruder, Wenger) using a feed rate of 180 lb/hr with a cylinder speed of 350 RPM and shaft speed at 160 RPM. 3.7 lb/hr steam was forced through cylinder while also feeding 4 lb of water/hr. The extruder was provided with a die containing 17, 2 MM die holes. Twin screw extruder contained 5 separately heated chambers each set to specific temperatures to control shear and expansion so as to adhere all ingredients in the blend to one another. The blend was extruded through the die and the extrudate was cut with the cutter to obtain puffed circular pellets (2-3 mm diameter). The puffed circular pellets were immediately dried using conventional belt dryer set at 175° F. (79.4° C.) and a slightly puffed, low density carbon, odor absorbing granular additive with minimal moisture content was obtained.

The extruder had five zones and the conditions in each zone were as follows:

| | |
|---|---|
| $1^{st}$ | 100 |
| $2^{nd}$ | 175 |
| $3^{rd}$ | 275 |

-continued

| | |
|---|---|
| 4$^{th}$ | 275 |
| 5$^{th}$ | 280 |

Example 4

Fifty lbs. spent carbon containing diatomaceous earth and powdered activated carbon available from Grain Processing Corporation of Muscatine, Iowa was obtained from starch hydrolysis production and was blended at the same level as Example 1 and 2, with 144 lbs. de-germinated ground corn grits from ConAgra), 2 lbs. citric acid from Tate & Lyle) and 4 lbs. fine grade salt from Cargill Inc. The blended material was extruded in a twin screw extruder (Model TX-57 brand twin screw extruder, Wenger) using a feed rate of 180 lb/hr with a cylinder speed of 350 RPM and shaft speed at 160 RPM. 3.7 lb/hr steam was forced through cylinder while also feeding 4 lb of water/hr. The extruder was provided with a die containing 36, 2 MM die holes to help decrease back pressure. The twin screw extruder contained five separately heated chambers set to specific temperatures to control shear and expansion to adhere all ingredients in the blend to one another. The blend was extruded through the die and cutter and puffed circular pellets (2-3 mm diameter) were obtained. The puffed circular pellets were immediately dried using a belt dryer set at 175° F. (79.4° C.) and a slightly puffed, low density carbon, odor absorbing granular additive with minimal moisture content was obtained. The extrudate produced had a loose density of around 25 lbs/cu. ft.

The extruder had five zones and the conditions in each zone were as follows:

| | |
|---|---|
| 1$^{st}$ | 100 |
| 2$^{nd}$ | 175 |
| 3$^{rd}$ | 275 |
| 4$^{th}$ | 275 |
| 5$^{th}$ | 280 |

Example 5

Spent filter material containing diatomaceous earth (15 lbs.) and powdered activated carbon (35 lbs.) available from Grain Processing Corporation of Muscatine, Iowa is obtained from starch hydrolysis production and is blended at the same level as Example 1 and 2, with de-germinated ground corn grits (144 lbs.) sourced from ConAgra, citric acid (2 lbs.) sourced from Tate & Lyle and fine grade sodium chloride salt, 4 lbs. sourced from Cargill. The blended material is extruded on a twin screw extruder (Model TX-57, Wenger). A die specially designed to form an extruded sheet is used. The extrusion condition is optimized so that the particular shape of dry expanded extrudate can be produced. The puffed form of extrudate is immediately dried using conventional belt dryer set at 175° F. (79.4° C.) to finalize a slightly puffed, low density carbon, odor absorbing sheet with minimal moisture content. The extrudate produced had a loose density of around 25 lbs/cu. ft.

The extruder had five zones and the conditions in each zone were as follows:

| | |
|---|---|
| 1$^{st}$ | 100 |
| 2$^{nd}$ | 175 |
| 3$^{rd}$ | 275 |
| 4$^{th}$ | 275 |
| 5$^{th}$ | 280 |

Using a different die permits an extrudate having other form to be produced. By using the appropriate die, pellets, beads or other extrudate shapes can be obtained.

Example 6

An extrudate of spent carbon materials or spent carbon from Examples 1-4 is added into an animal litter or bedding material at rate of 2% to 5% weight basis.

Example 7

An extrudate of spent carbon materials or spent carbon from Examples 1-4 is added into an animal litter or bedding material at rate of 2% to 5% weight basis. The litter is a corn based cat litter, which is made from corn and other absorbent materials.

It is thus seen that an odor-absorbing material is provided.

All percentages stated herein other than moisture percentages are specified on a dry solids basis unless otherwise indicated All references and prior applications cited herein are hereby incorporated by reference in their entireties. Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed:

1. An animal litter comprising a plurality of discrete particles of a sorbing material and particles of a puffed, odor-absorbing additive having spent carbon powder embedded therein, said additive having been prepared by a method comprising:
   (a) extruding a blend including spent carbon material and a matrix material under conditions sufficient to obtain an expanded extrudate comprising a puffed product; and
   (b) drying said puffed product to obtain the additive, said additive including carbon powder embedded in the puffed product.

2. The animal litter according to claim 1, wherein said animal litter has a sorption capacity of at least about 0.04 ml water per gram of litter.

3. An animal litter according to claim 1, wherein said spent carbon material is recovered from a starch hydrolysis production process.

4. An animal litter according to claim 1, wherein said spent carbon material is recovered from a brewing production process.

5. An animal litter according to claim 1, wherein said spent carbon material is recovered from a water treatment production process.

6. An animal litter according to claim 3, wherein said spent carbon material is originated from constituents comprising diatomaceous earth and powdered or activated carbon.

* * * * *